United States Patent [19]

Starrett

[11] 3,974,658

[45] Aug. 17, 1976

[54] CONTACT REFRIGERATION UNIT

[76] Inventor: Richard F. Starrett, 21 Upper Ardmore, Larkspur, Calif. 94939

[22] Filed: Aug. 20, 1975

[21] Appl. No.: 605,977

[52] U.S. Cl. .................................. 62/60; 62/371; 62/457; 62/530; 206/427; 220/9 F
[51] Int. Cl.² .................... B65B 63/08; F25D 3/08
[58] Field of Search ............... 206/427; 220/9 F; 62/457, 371, 372, 530, 60

[56] References Cited
UNITED STATES PATENTS

| | | | |
|---|---|---|---|
| 1,095,023 | 4/1914 | Parker | 62/457 |
| 1,681,110 | 8/1928 | Friedman | 62/457 |
| 2,504,911 | 4/1950 | Whitcear | 62/530 |
| 2,648,954 | 8/1953 | Wheeler et al. | 62/371 |
| 3,187,518 | 6/1965 | Bair et al. | 62/457 |
| 3,262,283 | 7/1966 | Taylor | 62/457 |
| 3,401,535 | 9/1968 | Palmer | 62/457 |
| 3,406,532 | 10/1968 | Rownd et al. | 62/457 |
| 3,802,220 | 4/1974 | Pompo | 62/530 |

*Primary Examiner*—Lloyd L. King
*Attorney, Agent, or Firm*—Flehr, Hohbach, Test, Albritton & Herbert

[57] ABSTRACT

A completely self-contained portable refrigeration unit for maintaining cans or bottles containing food products (e.g., beer, soft drinks, fruit juices, etc.) at a predetermined substantially constant temperature (e.g., 35° to 50°F.) for a relatively long period of time (10 to 24 hours or more). The unit includes an outer insulating case or container and an internal refrigeration cartridge having a plurality of curved surfaces adapted to contact the surface of the products (e.g., sides or ends). The cartridge is filled with a refrigerant substance (e.g., gel refrigerant with predetermined eutectic point) capable of maintaining the curved surfaces of the cartridge at substantially the desired refrigerating temperature for the desired period of time. The dimensions of the outer container and cartridge are such that individual products are in contact either with one of the curved cartridge surfaces or with one of the other products, to thereby achieve conductive refrigeration with minimum reliance on convection.

18 Claims, 17 Drawing Figures

GRAPH A

FIG. 16

GRAPH B

FIG. 17

GRAPH C

CONTACT REFRIGERATION UNIT

BACKGROUND OF INVENTION AND OBJECTS

This invention relates generally to a portable refrigeration unit, and more particularly to a portable contact refrigeration unit for a plurality of beverage containers to be maintained at a desired temperature.

Beverages such as beer, soft drinks, fruit juices and the like are conventionally sold in packs of six, eight or 12 cans or bottles. The purpose is to provide a convenient pack which may be carried along on a picnic or trip for subsequent use. While such beverage packs are commonly refrigerated by the retailer, the individual beverage containers will stay cool for only a very short period of time.

It is a principal object of the present invention therefore to improve upon carrying devices for beverage packs, particularly with respect to means for maintaining a desired cold temperature of the individual beverage containers for periods of time ranging up to 10 to 20 hours or longer.

It is another object of the invention to provide a self-contained contact refrigeration unit of the type described which is portable, and which is particularly adapted to maintaining the desired cold temperature of individual beverage containers in packs of six to 12 cans or bottles.

It is another object of the invention to provide a portable refrigeration unit of the type described wherein use is made of an internally nested refrigeration cartridge having a plurality of curved heat conducting surfaces dimensioned for surface contact with a plurality of said individual beverage containers.

It is another object of the invention to provide a self-contained refrigeration unit of such character which is relatively light in weight and of substantially the same size or only slightly larger than conventional carrying devices for the same purpose.

A still further object of the invention is to provide a self-contained refrigeration unit of the type described which is attractive in appearance, lightweight and durable of construction, and of such low cost that it may be disposed of at destination, or carried back for re-use.

Additional objects and advantages of the invention will appear from the following detailed description, and from the accompanying drawing.

SUMMARY OF THE INVENTION

Broadly stated, the present invention is directed to the concept of a portable self-contained refrigeration unit which makes use of an internal refrigeration cartridge nested in an outer insulating container in such fashion that a plurality of curved heat conducting surfaces are presented as an interior surface of the portable unit. The refrigeration cartridge is substantially filled with a refrigerant substance capable of maintaining the temperature of the inwardly exposed curved heat conducting surfaces at a substantially constant refrigerating temperature, say below 32°F., for a period of the order of at least 10 to 20 hours. The curved heat conducting surfaces are dimensioned for surface contact with conventional beverage cans or bottles with the result that a number of such beverage containers can be nested within the curved surfaces so as to be in contact with the same for heat exchange with the refrigeration substance within the refrigerant cartridge. The outer insulating container is dimensioned so that a plurality of the beverage containers can be positioned in contact with the curved surfaces of the refrigeration cartridge and in contact with one another so as to substantially fill the interior spaces of the portable unit. The refrigerant substance within the cartridge can be of the type (e.g., endothermic gel refrigerant) which can be activated to rapidly achieve a "frozen" state whereby the latent heat of fusion of the refrigerant substance serves to rapidly chill the curved heat conducting surfaces of the refrigerant cartridge and, thereby, the beverage containers placed in contact therewith. Through conduction, including conduction between beverage containers, the contents of the beverage containers likewise become chilled so that the entire pack of containers assumes a substantially uniform and constant temperature as determined by the "freezing" or "fusion" or "eutectic" temperature of the refrigerant substance within the cartridge. The described structure thus not only provides a self-contained refrigeration unit for the general purpose described, but also makes possible a number of advantages in the manufacture and use of the unit:

1. The refrigeration cartridge can be provided with curved heat conducting surfaces which are dimensioned for contact with varying parts of the beverage containers (e.g., ends or sides), and to provide maximum heat exchange contact with beverage containers of varying shapes (e.g., conventional cans, bottles, proprietary bottles, and the like).
2. The refrigerant substance can be formulated to provide a desired constant temperature particularly adapted to the beverage being transported (e.g., beer, wine, milk, soft drinks, etc.).
3. The outer container can be modified to serve as both a portable refrigerator and carrying case, for example, with a handle or shoulder strap to facilitate easy transport.
4. The unit and its contents can be prepackaged and sold for convenient use in the transport and storage of chilled beverages for periods ranging up to 24 hours.
5. The unit can be constructed of conventional materials which are both light and strong and which permit reuse by the purchaser, or disposal at destination.

The foregoing as well as other advantages of the invention will appear from the following description and from the drawing.

DESCRIPTION OF THE PREFERRED EMBODIMENTS

Figure 1:
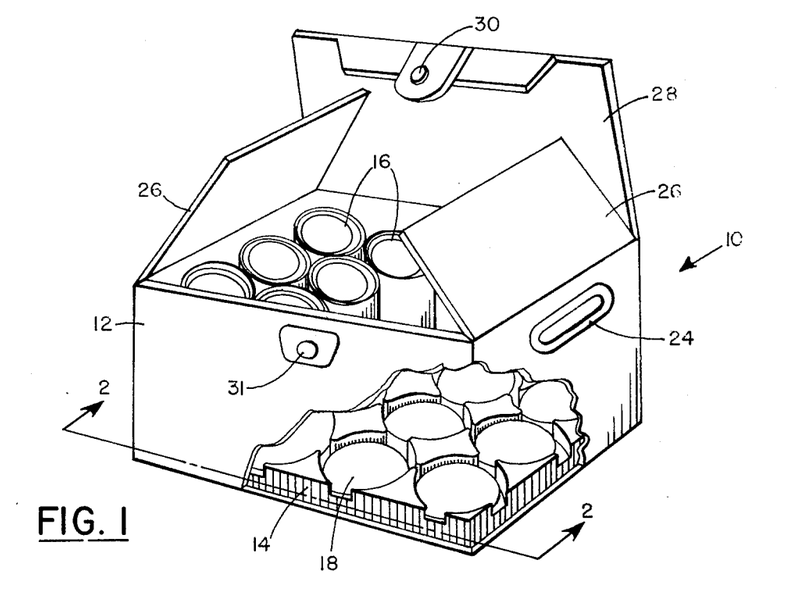
FIG. 1 is a view in perspective of a refrigeration unit in accordance with the invention, shown partly filled and partly open and with portions broken away for clarity of illustration.
Figure 2:
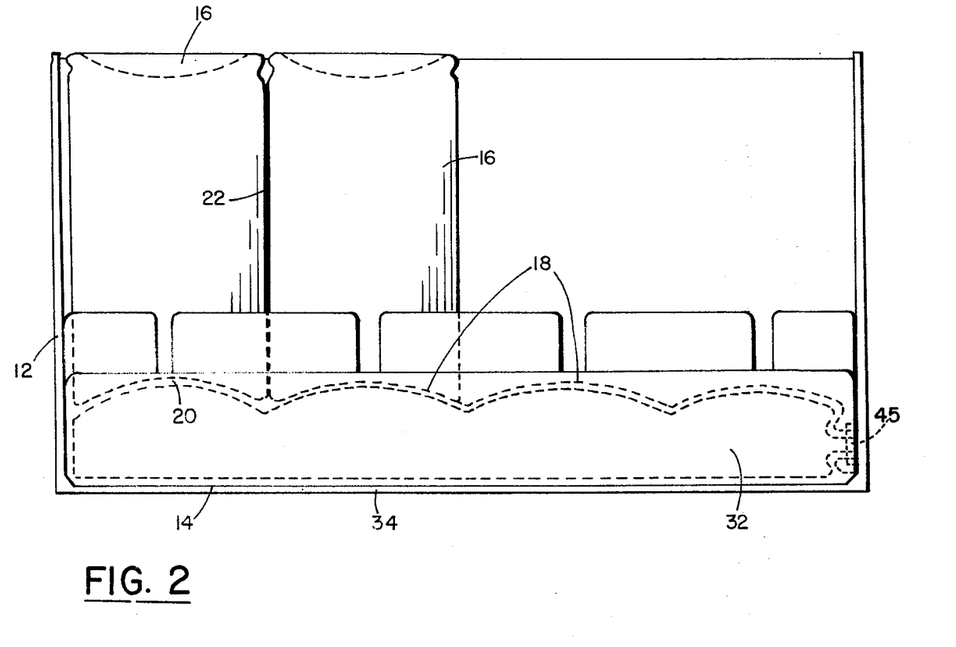
FIG. 2 is an enlarged fragmentary view in section, along the line 2—2 of FIG. 1.

Referring to FIG. 1, the reference numeral 10 represents a portable self-contained refrigeration unit embodying the features of the present invention. The unit 10 generally involves three principal elements: an outer carrying case or container 12 of insulating material, an internal refrigeration cartridge 14 nested within and adjacent a bottom surface of the outer container, and a plurality of beverage containers 16 substantially filling the space within the carrying case so that the individual containers 16 are in heat conductive contact with one another and with curved heat conducting surfaces of the refrigeration cartridge 14. For illustrative purposes, the refrigeration unit 10 is shown partly filled, and portions of the case 12 are broken away to show the upwardly convexed heat exchange surfaces 18, which are dimensioned and contoured to be received within the conventional concave bottom surface of a standard 12-ounce beverage can. This relationship is particularly illustrated in FIG. 2 where it may be seen that the contoured heat conducting surfaces 18 of the refrigeration unit 14 exactly fit within the concave recesses 20 of the beverage cans 16. By this arrangement, the contents of the beverage can 16 can be directly chilled and cooled by conduction through the contacting surfaces 18, 20, which cooling effect is complimented and enhanced by the contact between adjacent beverage cans, as at 22. It will thus be apparent that, in a 12-pack unit as illustrated in FIGS. 1 and 2, the total volume or space required for the refrigeration unit 10, including the outer case 12 and refrigeration cartridge 14, is only slightly larger than the space required for the beverage containers themselves. Considering the refrigeration capacity of the unit, as hereinafter described, this is a feature of importance in that it permits a 12-pack of beverage cans to be easily transported to a point of intended use or storage, for example, the trunk of a car, the beach, kitchen, etc. For such purposes, suitable carrying attachments can be provided, as the illustrated handles 24, a shoulder strap, or like means. To provide desired protection and insulation, the outer carrying case 12 can be constructed of a suitable low cost material such as pressed insulating or corrugated board, of strength and thickness to provide the desired characteristics. A suitable form of closure arrangement can also be provided, such as inner flaps 26, outer cover 28, and a snap fastener 30, 31.

It is a feature of the present invention that the refrigeration cartridge 14 is substantially filled with a refrigerant substance capable of maintaining the temperature of the curved heat conducting surfaces 18 at a substantially constant refrigerating temperature, say below 32°F., for relatively prolonged periods of time. By way of illustration, the substance may be a starch based gel refrigerant, or an endothermic eutectic composition which, upon being frozen, will remain at its "freezing" or "fusion" temperature until the frozen substance is entirely converted into the original gel or liquid state. With reference to FIG. 2, the refrigerant substance in the cartridge 14 is represented by the reference numeral 32. In the environment of the refrigeration unit 10, the frozen mass of the refrigerant substance 32 will function by heat exchange through the contacting surfaces 18 and 20 to consume heat from the beverage containers 16, and adjacent void spaces within the carrying case 12, until such time as the latent "heat of fusion" of the refrigerant substance 32 has been entirely consumed. Thus, assuming that the refrigerant substance 32 has a "freezing" or "eutectic" or "fusion" temperature of approximately 30°F., the cartridge surface temperature (i.e., the temperature of the curved heat conducting surfaces 18) will also approximate 30°F. The cartridge 14 functions to cool the beverage cans and their contents to a desired chilled temperature which will be within a range, say, of from 1° to 20° higher than the cartridge surface temperature, or, in the circumstances assumed, to approximately 31° to 40°F. The exact difference in temperature will depend upon the proportion of void spaces within the carrying case 12 and the type and thickness of insulating material used in fabricating the case 12, as well as other factors. Through proper selection of the components which make up the refrigeration unit 10, the period of time required to consume sufficient heat from the beverage containers 16 (i.e., to use up the "heat of fusion" of the refrigerant substance 32) may easily extend to a useful refrigeration period of 10 to 24 hours, or longer. As hereinafter described in detail, this result is possible because all essential heat flow from the beverage cans 16 is by conduction through the cans and their contents to the contacting surfaces 18 of the cartridge, with heat losses through convection and reflective heat flow thereby being minimized. Of course, longer periods of constant temperature refrigeration can be obtained by various procedures, for example, by prefreezing the cartridge or by selecting the components of the refrigerant substance 32 to provide a lower starting temperature, by increasing the insulating capacity of the material forming the walls of the carrying case 12, and so on. In general, thicker walls or additional outer insulation will function to retard heat loss and thereby both prolong the period of "heat of fusion" and narrow the temperature difference between the cartridge surfaces 18 and the temperature of the beverage container 16. Thus, very heavy insulation will tend to eliminate any temperature difference between the cartridge surface and the beverage containers, while greatly extending the period of constant temperature during the period of change in the state of the refrigerant substance from solid to liquid, or gel.

Figure 3:
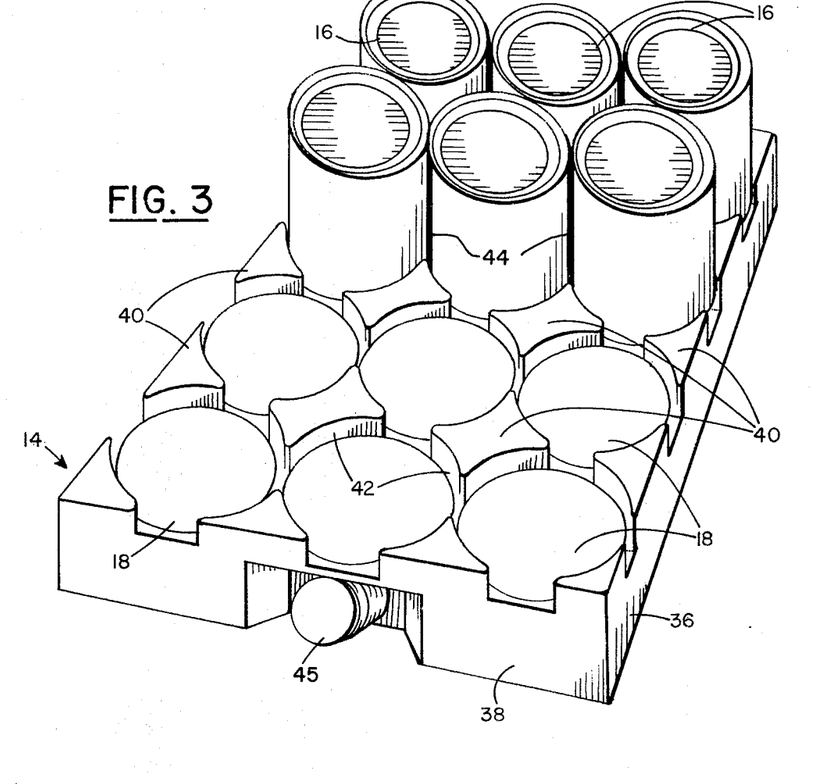
FIG. 3 is an enlarged view in perspective of the refrigeration cartridge, and supported beverage containers, as used in the embodiment of FIG. 1.
Figure 4:
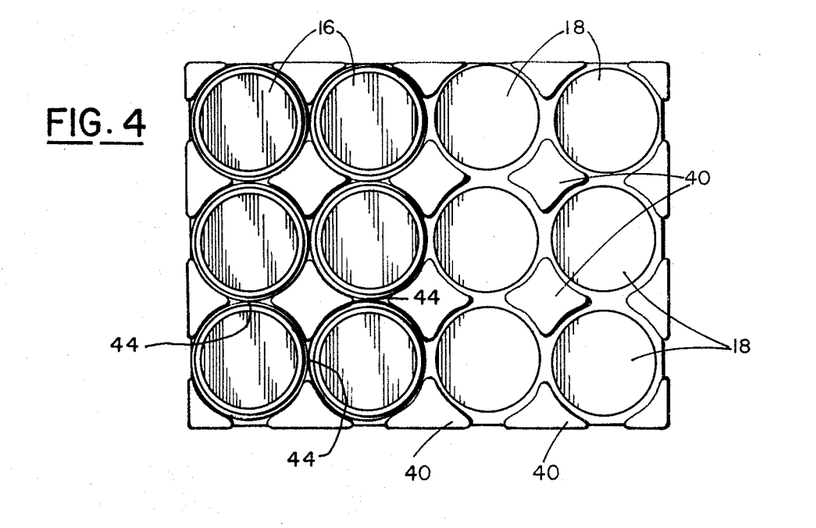
FIG. 4 is a plan view thereof on a slightly reduced scale.

Referring particularly to FIGS. 2 – 4, it will be seen that the refrigerant cartridge 14 is constructed as a six-sided unit having a substantially flat bottom 34 and upstanding sides 36 and ends 38. Its upper surface is generally contoured to provide the curved heat conducting surfaces 18, recessed between spaced container guide segments or supports 40. As will be appreciated, the surfaces 18 and segments 40 provide a means to nestingly receive the beverage containers 16 so that their inwardly curved bottom surfaces 20 are in heat conduciting contact with the correspondingly curved surfaces 18 of the cartridge, and their sides are held in contact with one another by the upstanding guide surfaces 42 of the segments 40. FIG. 4 particularly illustrates the manner in which the segments 40 hold the cans 16 in contact with one another, as at 44, as well as in contact with the heat conducting surfaces 18.

In general, the refrigerant cartridge 14 may be constructed of available low cost materials such as readily available metals or any of a variety of plastics possessing desired flexibility and strength within the anticipated range of operating temperatures (e.g., acrylates, polyacrylates, vinyl or polyvinyl resins, styrenes or polystyrene resins, polyethylene and others). Since the particular techniques for forming and fabricating the refrigerant cartridge do not constitute a feature of the present invention, they will not be considered in further detail. In general, the refrigerant cartridge is provided with a filling spout and closure, as generally represented at 45 in FIGS. 2 and 3, to receive the refrigerant substance 32.

As previously noted, the particular refrigerant substance 32 employed within the refrigeration cartridge 14 may take different forms. Desirably, however, the refrigerant substance should have a substantial heat of fusion within the desired range of surface temperatures of the refrigerant cartridge 14. Thus, for use as a contact refrigeration unit for beverage containers, the desired range of temperatures for the heat conducting surfaces 18 would be about −20° to about 40°F. Satisfactory heats of fusion of the refrigerant substances employed to maintain a constant "freezing" or "fusion" temperature within this range, say, at 30°F., would be in the general range from about 8 to 200. Examples of refrigerant substances satisfying these requirements include the various starch based gel refrigerants disclosed, for example, in Shepherd U.S. Pat. No. 2,800,454. The gel refrigerants therein disclosed are generally based on the proportion of 100 parts of starch (ungelatinized or pregelatinized) to 5 to 100 parts of borax, and between 300 and 1800 parts of water by weight. Such gel refrigerants have "freezing" or "fusion" or "eutectic" points approximating 25° to 30°F, and within the range indicated to be satisfactory for purposes of the invention. As further disclosed in the Shepherd patent, gel refrigerants with lower freezing points can be produced by adding various well known eutectic depressants such as sodium chloride, calcium chloride, sodium sulfate, potassium nitrate, potassium chloride, sodium carbonate, or other soluble metallic salts. Through use of such salts in proportions by weight ranging to 2 parts for each 100 parts of starch, the freezing point can be easily depressed to within the range from about −6° to about 20°F.

A further satisfactory refrigerant substance for use in the invention is in the form of a two phase colloidal system or gel, wherein use is made of a dry gel formula which can be mixed with water just prior to use. Upon vigorous agitation or mixing of the ingredients, the colloidal system sets to a gel (viz, rheopexy), which is thereafter mechanically frozen within the cartridge by placing the same in a low temperature environment, say, below 32°F. Thus, assuming that there are approximately 100 parts of such a refrigerant substance substantially filling the internal space of the refrigerant cartridge 14, the composition can be approximately 1 to 5 parts of borax, 1 to 5 parts of a carbohydrate in the form of a high molecular weight polysaccharide (e.g., a xanthan gum, identified as "Kelzan" and sold by the Kelco Company, San Diego, Cal.) and the balance (90 to 98 parts) water. A refrigerant substance formulated by merely agitating a mixture of the foregoing ingredients can be in the form of a gel which has a "freezing" or "fusion" temperature in the desired range of about −20° to 40°F., and a somewhat higher heat of fusion of the order of 185. Following freezing, the time required to transfer solidified gels of this general type through the change of state known as "heat of fusion" will easily range up to 24 hours or longer, depending upon the nature of the insulating materials forming the outside carrying case 12.

The refrigerant substance is also advantageously formulated with an endothermic substance capable of achieving a substantial temperature reduction at the time of gel formulation, by means of endothermic reaction. By way of illustration, a particularly satisfactory gel refrigerant of this type is formulated by adding a quantity of commercially available "prelled" ammonium nitrate to the gel formula just described. More specifically, assuming 200 parts of such a refrigerant substance, the composition can be approximately 100 parts ammonium nitrate, about 1 to 5 parts of borax, 1 to 5 parts of xanthan gum, and the balance (90 to 98 parts) water. Upon mixing and agitating to initially form an aqueous sol, such composition undergoes rapid endothermic formation of a gel, with an almost instantaneous drop in temperature of the order of 40°F. A refrigerant cartridge filled with a refrigerant substance of this type can be "activated" simply by mixing and agitating the ingredients within the cartridge, to provide a chilled cartridge having a surface temperature approximately 40° below the starting temperature. Thus, assuming a normal ambient or "room" temperature of about 72°F., the cartridge surface temperature would be close to the freezing point of water. A refrigerating cartridge 14 filled with such a gel can be agitated and placed in the bottom of the refrigeration unit 10, the beverage containers 16 inserted in nested relation thereabove, and the container closed to effect an initial chilling of the beverage containers to a desired storage temperature of the order of 35° to 40°F.

As previously noted, it may be desirable to mechanically freeze the contents of the cartridge 14 by placing the same in a low temperature environment, that is, below 32°F., to insure that the contents of the cartridge are rapidly converted to a frozen solid state. This would particularly be the case with the gel refrigerants based on the colloidal systems composed of water, borax and xanthan gum. In accordance with the invention, beverage containers in contact with a cartridge containing a solidified gel of this type will remain at approximately the desired storage temperature for periods of 10 to 20 hours, or longer, until the heat of fusion of the solidified gel has been consumed.

As a still further variation of the invention, liquified gas cartridges (e.g., containing liquified nitrogen or carbon dioxide) can be used as adjuncts to the refrigeration cartridge 14, for purposes of providing an extremely low starting temperature for the cartridge unit, for example, −40° to −50°F. Thus, assuming use of a gel refrigerant of the type disclosed in Shepherd U.S. Pat. No. 2,800,454, or in particular, a temperature reducing endothermic gel based on use of an ammonium nitrate-borax-xanthan gum mixture of the type just described, the initial temperature of the gel can be further depressed by releasing the contents of the cartridge into the interior of the cartridge chamber containing the refrigerant substance 32. The effect would be to both freeze and to depress the temperature of the gel for an indeterminate period of time, until the refrigerant substance warmed up to its fusion point, following which the cartridge would act in the manner previously described to maintain the contents at a uniform desired temperature for a period related to the heat of fusion of the gel (e.g., 10 to 30 hours). Such use of the refrigerating cartridge would permit the refrigeration unit to be activated for initial low temperature transportation of the contents, say, for a period of 50 to 100 hours, following which the unit could be counted upon to function in the previously described manner.

Figure 5:
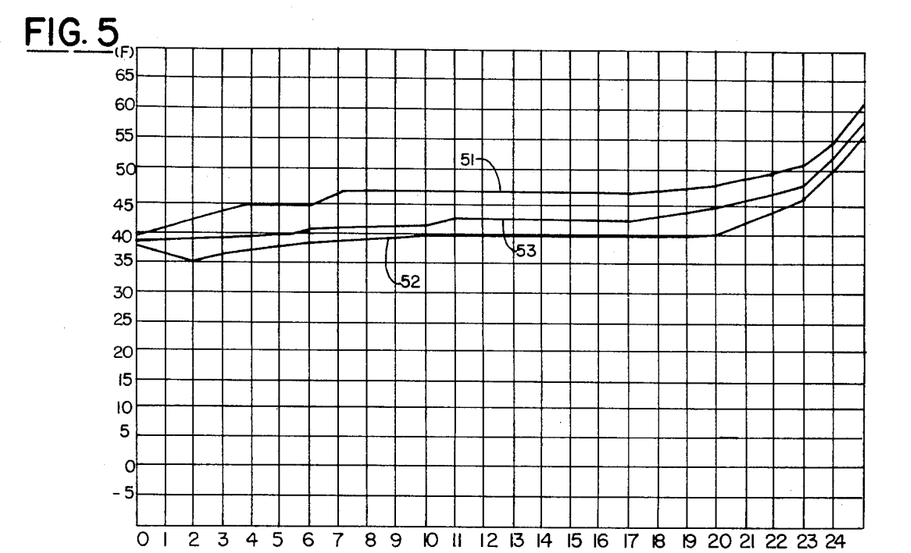
FIGS. 5 and 6 are graphs illustrating the performance of the refrigeration unit of FIGS. 1 - 4.
Figures 6, 7:
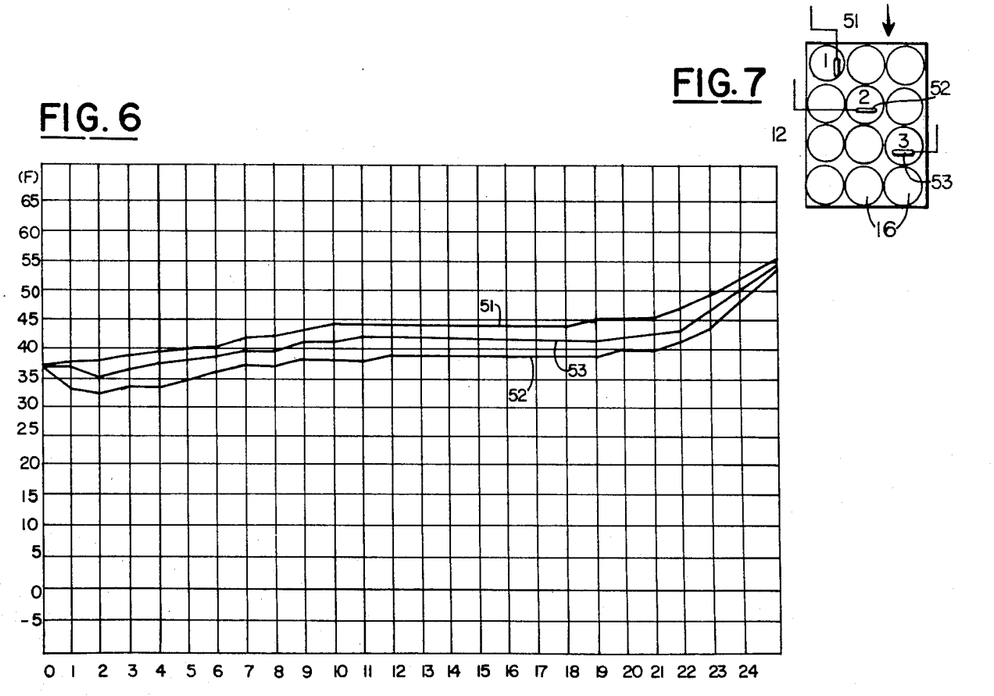
FIG. 7 is a schematic view showing the placement of temperature sensors for purposes of recording the results of FIGS. 5 and 6.

Specific examples of the application and use of the refrigeration unit of the invention will now be considered in conjunction with a refrigeration unit 10 as illustrated in FIGS. 1 through 4 and the performance graphs shown in FIGS. 5 and 6.

EXAMPLE 1

In a refrigeration unit constructed according to the embodiment of FIGS. 1 – 4, the outer case 12 is formed of ⅛ inch layers of polystyrene foam (density 0.3 grams per centimeter square), sandwiched between outer layers of white Kraft paper (total thickness 3/16 inch). The refrigerant cartridge 14 is substantially filled with a refrigerant substance having the following formulation:

|  | Parts by Weight |
|---|---|
| Water | 100 |
| Borax | 2 |
| Xanthan gum ("Kelzan", Kelco Co.) | 2 |

The refrigerant cartridge is agitated vigorously for approximately 1 minute, mechanically frozen and then placed in the bottom of the carrying case in the position illustrated in FIG. 1. Twelve 12-ounce cans of beverage are then positioned within the carrying case so that their bottom surfaces 20 are in contact with the heat conducting surfaces 18 of the refrigeration cartridge 14 (see FIG. 2). Three of the twelve beverage containers are provided with temperature sensing probes at positions generally represented at 41, 52, and 53 in FIG. 7. Leads from the probes are connected to a temperature testing unit (Simpson Model 413, Simpson Electric Company, Chicago, Ill.), which functions to continuously record the temperature sensed by the three separate probes. With the beverage containers at a temperature of approximately 36°F. and the air temperature at approximately 72°F., the test is started by closing the flaps 26 and cover 28 of the case 12 and initiating operation of the temperature recording unit. A plot of the temperatures of the three probes over a period of 24 hours is presented in FIG. 5, wherein graph 51 represents the continuous recordation of the temperature at probe 51, graph 52 the continuous recordation of the temperature at probe 52, and graph 53 the continuous recordation of the temperatures at probe 53.

As will be apparent from FIG. 5, the refrigeration unit 10 functions to maintain a substantially constant temperature of the beverage containers 16 for a period of approximately 20 hours, with temperatures within the period from about 5 to 18 hours holding within a range from about 39° to 48°F. As might be expected, the centrally located probe registers the lowest holding temperature, about 40°F., whereas the exteriorally positioned sensors 51 and 53 register holding temperatures, respectively, of 47° and 43°F.

EXAMPLE 2

A substantially identical test as described in Example 1 is carried out in conjunction with a refrigeration unit which differs only in the use of a carrying case 12 constructed with an additional layer of 250-test corrugated board on all four sides, bottom and top. In every other respect, the testing conditions are the same.

As illustrated in FIG. 6, the effect of employing an additional layer of corrugated insulation is to maintain the temperature of the beverage containers 16 within a somewhat lower holding range. Thus, the temperature of the centrally positioned beverage container (probe 52) is substantially constant at about 37°–39°, whereas the holding temperatures of the exteriorally positioned beverage containers (probes 51 and 53) ranges from about 40°–44°. In general, the performance of the refrigeration unit is substantially as previously described except that the additional insulation makes possible a holding temperature approximately 3° to 4° lower than previously obtained.

EXAMPLE 3

The test of Example 2 is repeated except that the formulation of the refrigerant substance in cartridge 14 is varied to provide a lower "freezing" or "eutectic" point as follows:

|  | Parts by Weight |
|---|---|
| Water | 100 |
| Borax | 2 |
| Xanthan gum | 2 |
| Sodium chloride | 2 |

Figure 8:
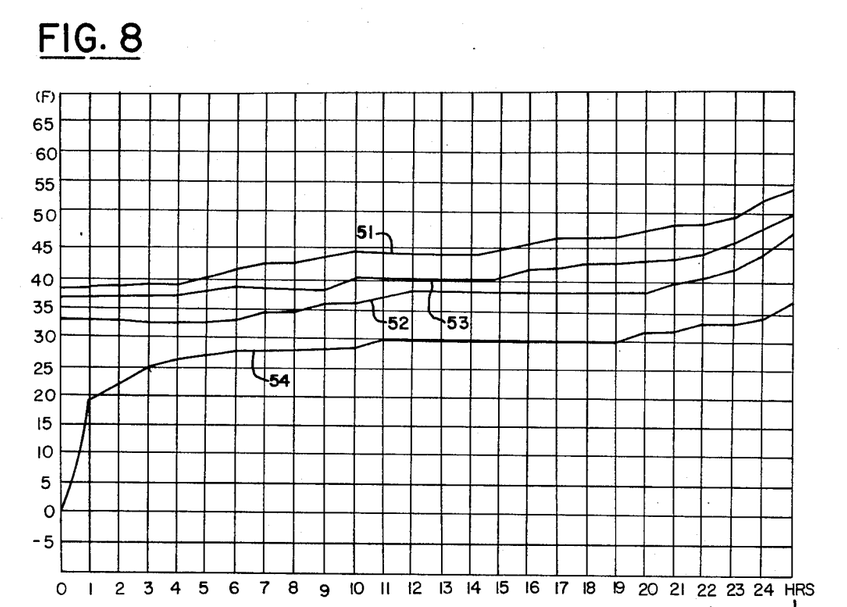
FIGS. 8 and 9 are views like FIGS. 5 and 6 showing additional performance characteristics of the refrigeration unit, as well as surface temperatures of the refrigerant cartridge.
Figures 9, 10:
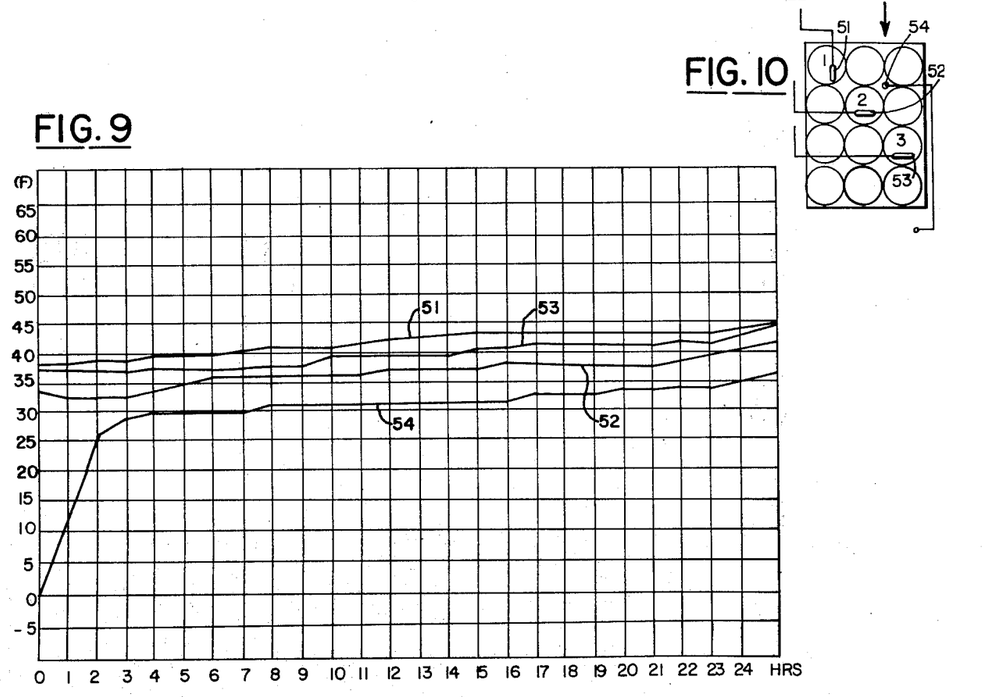
FIG. 10 is a schematic view like FIG. 7 showing the placement of temperature sensors for recording the results shown in FIGS. 8 and 9.

The test procedure is further varied by addition of a fourth temperature probe 54, suspended approximately one-half inch above the upper surface of the refrigeration cartridge 14, at the position 54 in FIG. 10. The temperatures recorded in this test are graphically shown in FIG. 8.

In carrying out this test, the beverage containers 16 and the refrigeration cartridge 14 are pre-chilled to a temperature of 36°F. Upon vigorously agitating the refrigerant cartridge, the modified gel forming mixture is mechanically frozen to obtain a starting surface temperature of the cartridge of about 0°F. This result is represented by the graph 54 in FIG. 8. It will be further noted that the gel mixture continues to absorb heat from the beverage containers 16 until the cartridge reaches the approximate fusion temperature of the refrigerant substance, at about 30°F., which temperature is maintained until nearly 20 hours after the start of the test. The temperatures recorded by the sensors 51, 52 and 53 are substantially identical to those obtained in Example 2 except for slightly higher readings (23°) after about 14 hours.

EXAMPLE 4

The test of Example 3 is repeated except that the carrying case 12 is modified by the addition of a half inch thickness of polystyrene foam sandwiched between white Kraft papers, on all four sides, bottom and top. As illustrated in FIG. 9, the effect of this added insulation is to maintain a relatively constant holding temperature of the beverage containers at each of the positions 51, 52 and 53 for substantially the entire 24 hour period of the test. The general conclusion, therefore, is that the added insulation provides a longer period of holding at contstant temperature, as respects the contents of the refrigeration unit 10.

Although the examples herein use mechanical means to convert the refrigerant substance within the cartridge 14 to a solid frozen form, the present invention also contemplates the use of certain endothermic substances or mixtures which have the capacity to achieve the same result, chemically, through endothermic reaction to lower the temperature of the refrigerant substance below its freezing point. For example, as previously noted, prelled ammonium nitrate has the capacity to lower the temperature of the gel mixture by as much as 40°F., and thus is capable of use for such purpose.

The foregoing disclosures have related generally to a refrigeration unit 10 wherein the refrigeration cartridge 14 is positioned at the bottom of the unit and the beverage containers are placed on top of the cartridge in heat conducting contact with the surfaces 18. FIGS. 11 through 14 illustrate a modified embodiment of the invention wherein the refrigerant cartridge, represented at 60, is positioned at the top of the unit. Thus, as particularly shown in FIGS. 11 and 12, a carrying case is provided in the form of an upright rectangular container 62, dimensioned to receive the beverage containers in transverse position (see lower portion of FIG. 11). As in the previous embodiment, the case 62 is conveniently constructed of low cost material such as pressed insulating or corrugated board 64 provided with an outer layer 66 of relatively heavy Kraft paper or the like. The cover 68 may be recessed, as shown, for insulating purposes. A carrying strap or handle 70 may also be provided, as suggested in phantom in FIG. 11.

Figure 12:
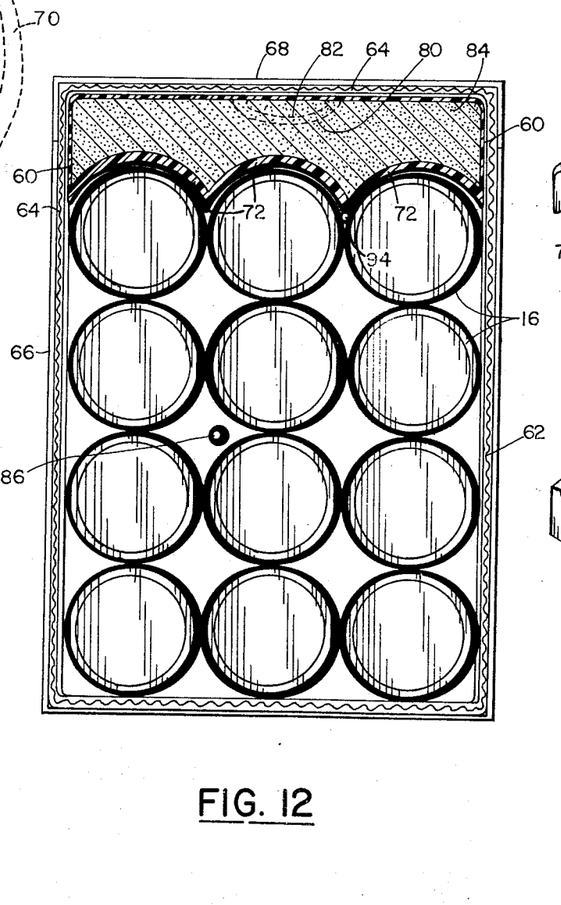
FIG. 12 is a view in section along the line 12—12 of FIG. 11, but showing the cover of the refrigeration unit in closed position.
Figure 13:
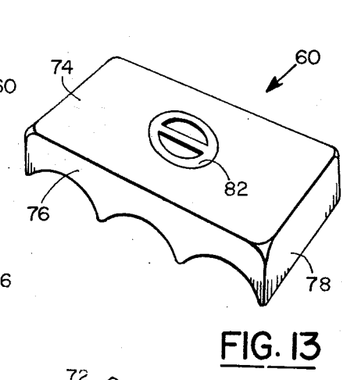
FIG. 13 is a view in top perspective of the refrigeration cartridge as used in the embodiment of FIGS. 11 and 12.

As illustrated in FIGS. 12 – 13, the refrigerating cartridge 60 is provided with a plurality of transverse concave heat conducting surfaces 72 each of which is dimensioned and contoured to exactly receive the cylindrical outer surface of a beverage can, for example, a standard 12-ounce container. This relationship is particularly shown in the sectional view of FIG. 12, which illustrates the manner in which the cartridge 60 rests on the upper layer of beverage containers 16. It will be appreciated that this relationship is the same, regardless of whether the container 62 is dimensioned for a 6, 8, or a 12-pack unit. The arrangement of the cartridge 60 is otherwise substantially as previously described, that is, the top layer of beverage containers 16 is directly chilled and cooled by conduction through the contacting surfaces 72, and this cooling effect is transmitted to the lower containers primarily by conduction through the beverage containers 16 and their contents. Again, as demonstrated by the sectional view of FIG. 12, the total volume or space required for the refrigeration unit is only slightly larger than the space required for the beverage containers themselves.

Figure 14:
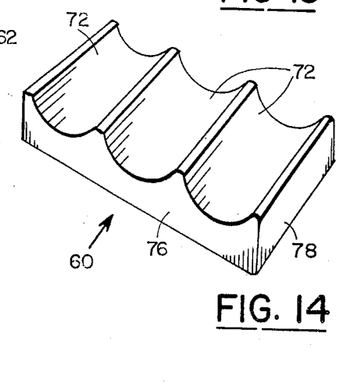
FIG. 14 is a view in bottom perspective thereof.

With particular reference to FIGS. 13 and 14, the refrigerant cartridge 60 is shown as a six-sided unit having a substantially flat top 74, upstanding sides 76 and ends 78 and, of course, the curved heat conducting surfaces 72. Although shown as concave cylindrical surfaces, the surfaces 72 may be dimensioned and contoured to exactly receive various proprietary bottle or jar configurations, as may be utilized for particular fluid or beverage containers. To facilitate introduction of a refrigerant substance into the refrigeration cartridge, a suitable access opening 80 and closure 82 are provided at any convenient location (e.g., top, side or end).

In the use of the refrigerant cartridge 60, a refrigerant substance 84 of the type previously described is introduced through the access opening 80, 82 to substantially fill the internal volume of the container. The type and form of a particular refrigerant substance can be as previously described (e.g., a starch based gel refrigerant as in Shepherd U.S. Pat. No. 2,800,454, an endothermic colloidal gel based on ammonium nitrate, borax and Xanthan gum, etc.). Following placement of the beverage containers in the carrying case 62 in the manner illustrated and described (see FIG. 11), the refrigeration cartridge 60 can be activated (and, if desired, prechilled and/or prefrozen) and placed in contact with the top layer of beverage containers to provide the desired refrigerating contact. The top cover 68 is then closed to permit the case and its contents to be transported or stored in the previously described manner, with assurance that the refrigeration cartridge will initially achieve and thereafter maintain a holding temperature at the "heat of fusion" of the gel, for periods ranging from 10 up to 30 hours, or longer. Again, the duration of the period of relatively constant temperature refrigeration will depend upon the initial temperature of the cartridge, the amount and thickness of insulation in the container walls, and to a lesser extent, upon the size and configuration of the refrigeration unit (i.e., 6, 8, or 12-pack).

Figure 15:
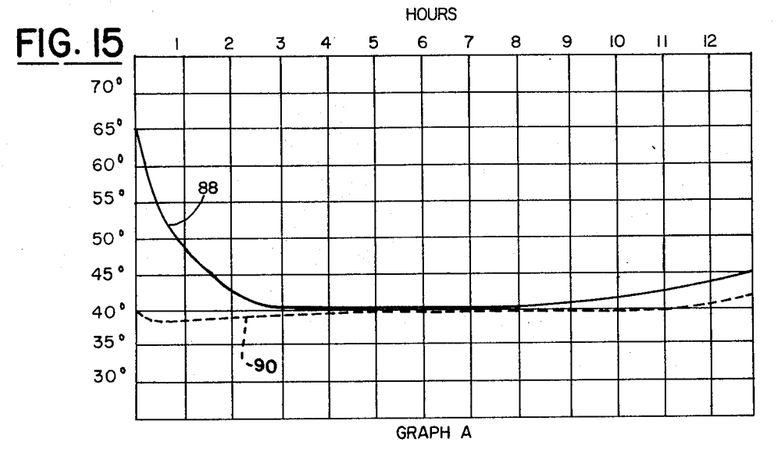
FIGS. 15 and 16 are graphs illustrating the performance of the refrigeration unit of FIGS. 11 – 14.
Figure 16:
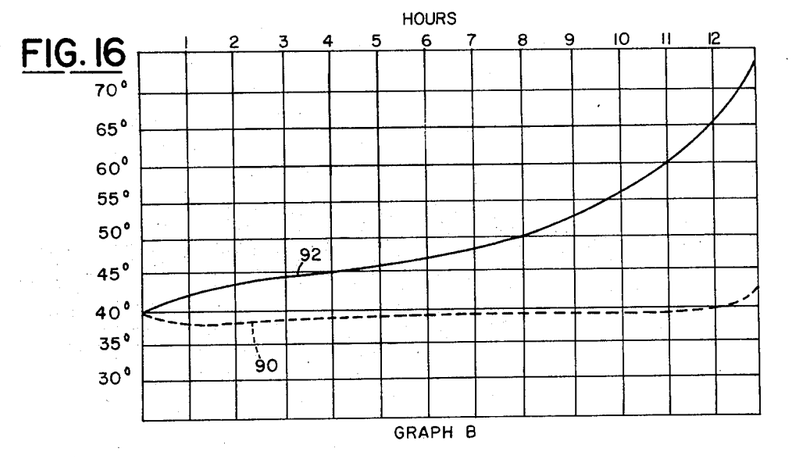
Figure 17:
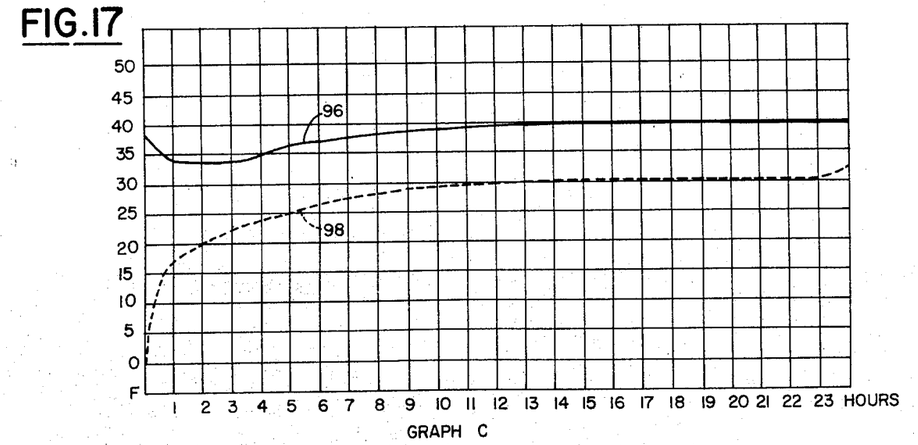
FIG. 17 is a similar graph showing the performance of the refrigerant unit over a longer time period.

Specific examples of the use and application of the refrigeration unit shown in FIGS. 11 through 14 will now be considered in conjunction with performance graphs, as presented in FIGS. 15 through 17.

EXAMPLE 5

Figure 11:
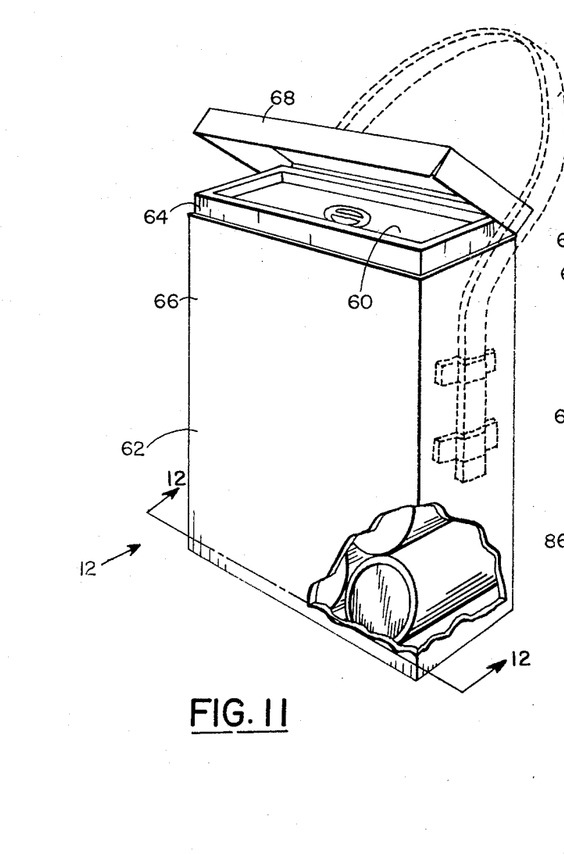
FIG. 11 is a view like FIG. 1 of another embodiment of the refrigeration unit in accordance with the invention.

A refrigeration unit is constructed generally in accordance with the embodiments of FIGS. 11 – 13, employing ¼ inch light corrugated board (125 pound test) with outer and inner layers of two-ply white Kraft paper (total thickness 3/16 of an inch). The refrigerant cartridge 60 is substantially filled with the refrigerant substance described in Example 3, and, following vigorous agitation, is placed in contact with the top layer of 12-ounce beverage cans in the manner illustrated in FIG. 12. The temperature of the cans is sensed by a temperature probe positioned in a central region, represented at 86 in FIG. 12, and the temperatures recorded for a period of about 13 hours with a conventional temperature testing unit (Simpson Model 389, Simpson Electric Company, Chicago, Ill.) capable of continuously recording the sensed temperatures within ±2°F.

FIG. 15 represents the results of two separate tests carried out at an ambient temperature of 70°F., the first employing beverage cans at the ambient temperature, represented by the curve 88, and the second employing beverage cans prechilled to 40°F., as represented by the curve 90. In the first instance, the refrigeration unit functions to cool the beverage cans from the initial temperature of 70°F. to a holding temperature of about 40°F., in approximately 3 hours, and thereafter functions to maintain the temperature of the beverage containers within the range from 40° to 45°F. for an additional 10 hours. In the case of the beverage cans prechilled to 40°F. (curve 90), the refrigeration unit initially functions to further chill the beverage containers to about 38°F, and, thereafter, to hold the temperature of the beverage containers at a temperature slightly below 40°F. for a total period of 11 hours, following which the temperature of the beverage containers increases slightly to about 42°F. Assuming an approximate fusion temperature of the refrigerant substance at about 30°F., as in Example 3, the refrigeration unit generally functions to maintain a substantially constant temperature of the beverage containers, at about 40° to 45°F., for a period ranging from 11.5 to 13 hours, or longer, depending upon the starting temperature of the beverage containers.

EXAMPLE 6

The test of Example 5 is repeated except that the refrigerant substance in the cartridge 60 is replaced with conventional ice (temperature 32°F.). The refrigerant cartridge 60 filled with ice is then placed in contact with the top row of the beverage containers, which have been prechilled to 40°F. The temperatures recorded in this test are graphically shown in FIG. 16 by the curve 92. For comparison, the results obtained with use of a refrigerant cartridge of Example 3, prechilled to 40°F. (i.e., curve 90), is shown in dotted outline.

In general, the performance of the refrigerating unit based on use of ice is unsatisfactory, in the sense that the refrigerating unit fails even to maintain a chilled temperature of the beverage containers, and clearly fails to maintain a substantially constant refrigerating temperature. Thus, the temperature of the beverage containers chilled only by use of ice rises in a relatively short period of time (2 to 4 hours) to a temperature of 45°, and at the end of 12 hours reaches a temperature approximating the outside or ambient temperature (i.e., 65°F.). By way of contrast, as noted in Example 4, the beverage containers chilled by the refrigeration unit of the present invention are still at a temperature below 40°F., at the end of 12 hours.

EXAMPLE 7

A substantially identical test as described in Example 4 (and represented by the curve 90 in FIG. 16) is carried out with a refrigeration unit which differs only in the use of a carrying case 62 constructed with an additional layer of insulation comprising one-half inch of rigid polystyrene foam board applied to all four sides, bottom and top. In this case, the gel forming mixture is mechanically frozen to obtain a solidified mass at about 0°F. The testing conditions are otherwise the same, except that the surface temperature of the refrigeration unit 60 is also sensed by a temperature probe positioned at the point 94 in FIG. 12.

As illustrated in FIG. 17 by the curve 96, the effect of employing the additional insulation is to cause an initial temperature lowering of the beverage containers 16 (in a period of about an hour) to approximately 34°F. Thereafter, the temperature of the beverage containers rises slightly to about 40°F. (in a period of 10 to 11 hours), following which the temperature remains substantially constant at just below 40°F. for a total period in excess of the 24 hour period of the test. It is further noted that the starting surface temperature of the cartridge is at about 0°F. This result is represented by the curve 98 in FIG. 17. By reference to the latter curve, it will be further noted that the gel mixture functions to absorb heat from the beverage containers 16 until the cartridge has reached the approximate fusion temperature of the refrigerant substance (about 30°F.) at the end of about 10 hours. Thereafter, the cartridge temperature is substantially constant at about 30°F. for another 12 to 13 hours, at which point a slight rise in the surface temperature of the cartridge is noted. The results clearly illustrate the benefits to be obtained from the refrigeration unit of the present invention, in maintaining the stored beverage containers at a substantially constant predetermined temperature for periods ranging up to 24 hours or longer.

Keeping in mind the principles just described, and the illustrative results of the specific examples, the refrigeration unit of the present invention can take various forms. Thus, as previously noted, the curved heat conducting surfaces of the refrigerating cartridges (e.g., 18 or 72) can be specifically dimensioned and contoured for use with varying types of beverage containers, for example, wine bottles of differing configuration, soft drink bottles or cans, and various brands of beer and ale, or the like. Refrigerating cartridges in the general forms illustrated (e.g., 14 or 60) can therefore be designed for proprietary use in conformance with design specifications as necessitated by the particular beverage container or merchandising factors involved. The only essential requirement is that there be a substantial contact between the curved heat conducting surfaces of the refrigeration cartridge, represented by the surfaces 18 and 72 in the embodiments illustrated, and at least one layer of beverage containers. In general, the degree of such contact should be such that at least 10 to 30% of the outer surface of a beverage container is in heat exchange contact with a cooling surface 18 or 21 of the cartridge. In like fashion, the refrigerant substance substantially filling the refrigerant cartridge can take many forms. An essential requirement, as previously noted, is that the refrigerant substance have a substantial heat of fusion within a desired range of surface temperatures for a particular desired holding temperature. According to the principles of the present invention, such temperatures would generally be within the range from about −20° to about 40°F. but, in particular instances, for example to maintain a preselected wine temperature, cartridge surface temperatures ranging as high as 50°F., or higher, might be desired. The manner and form of the insulation for the outer case can also be varied to meet particular requirements. By way of illustration, various reflective materials might be used as an outer (or inner) layer in a laminate construction, to reduce radiation losses in accordance with well known principles. These and other variations in the construction and application of the invention will, of course, suggest themselves to those skilled in the art to which the present invention pertains, without departing from the spirit and scope thereof. Accordingly, it is not intended that the invention be limited to the specific embodiments herein illustrated and described, except as defined in the appended claims.

What is claimed is:

1. A self-contained contact refrigeration unit characterized by an ability to maintain a plurality of substantially cylindrical beverage containers at a desired constant temperature for a relatively prolonged period of time, comprising: an outer insulating container, an internal refrigeration cartridge nested within said outer container, said refrigeration cartridge having a plurality of curved heat conducting surfaces dimensioned for surface contact with a plurality of said substantially cylindrical beverage containers, said refrigeration cartridge being substantially filled with a refrigerant substance capable of maintaining the temperature of said curved heat conducting surfaces at a substantially constant refrigerating temperature for a period of the order of at least 10 to 24 hours, and a plurality of substantially cylindrical beverage containers substantially filling the space within said container so that individual containers are either in close heat exchange contact with one of said curved heat conducting surfaces or with another of said beverage containers, whereby heat transfer for refrigeration purposes is achieved primarily by conduction between said beverage containers and said refrigeration cartridge to maintain each of said beverage containers at a substantially uniform temperature as related to the surface temperature of said curved surfaces and as predetermined by the nature of the refrigerant substance within said refrigeration cartridge.

2. A contact refrigeration unit as in claim 1 wherein the curved heat conducting surfaces of said refrigeration cartridge are contoured and dimensioned to contact at least 10 to 30% of the outer surface of a beverage container in heat exchange contact therewith.

3. A contact refrigeration unit as in claim 1 wherein said refrigeration cartridge is positioned at the bottom of said outer insulating container.

4. A contact refrigeration unit as in claim 1 wherein said refrigeration cartridge is positioned at the top of said outer insulating container, and beneath a closure therefor.

5. A contact refrigeration unit as in claim 1 wherein said refrigerant substance is a gel refrigerant in the form of a eutectic mixture having a fusion point within the range from about −20° to +40°F.

6. A contact refrigeration unit as in claim 5 wherein the eutectic mixture forming said gel refrigerant is composed essentially of starch, water and borax.

7. A contact refrigeration unit as in claim 6 wherein said starch is ungelatinized starch.

8. A contact refrigeration unit as in claim 6 wherein said starch is pregelatinized starch.

9. A contact refrigeration unit as in claim 6 wherein said eutectic mixture includes a small amount of a metallic salt to lower the freezing point of said gel refrigerant.

10. A contact refrigeration unit as in claim 1 wherein said refrigerant substance is composed essentially of xanthan gum, borax and water, said refrigerant substance being capable of forming a gel upon vigorous agitation by hand.

11. A contact refrigeration unit as in claim 10 wherein said refrigerant substance additionally includes sodium chloride.

12. A contact refrigeration unit as in claim 1 wherein said refrigerant substance is prechilled by rapid expansion of a liquified gas into said refrigeration cartridge.

13. A contact refrigeration method for maintaining the temperature of substantially cylindrical beverage containers in a portable unit at a desired constant temperature for a relatively long period of time, comprising the steps of isolating a plurality of cylindrical beverage containers within an insulated environment, contacting at least one layer of said substantially cylindrical beverage containers with a refrigeration unit having correspondingly curved heat conducting surfaces which are contoured to provide intimate surface contact with said beverage containers, the degree of contact between said refrigeration unit and said beverage containers being such that at least 10 to 30% of the outer surface of said beverage containers is in heat exchange contact with said refrigeration unit, said refrigeration unit being substantially filled with a gel refrigerant substance at a temperature below its fusion temperature, and holding said beverage containers in isolation with said refrigeration unit for a period of time sufficient to permit the latent heat of fusion of the refrigerant substance to be substantially entirely consumed.

14. A method as in claim 13 wherein said refrigerant substance is a gel refrigerant having a fusion temperature within the range from about −20° to +40°F.

15. A method as in claim 14 wherein said gel refrigerant has a latent heat of fusion within the range from about 8 to 200 B.T.U. per pound at the fusion temperature.

16. A method as in claim 12 wherein said refrigerating unit is filled with an endothermic rheopexic gel refrigerant of the type which sets to a gel upon agitation, and said refrigeration unit is initially agitated to effect an endothermic reduction in temperature of said gel refrigerant substance.

17. A method as in claim 16 wherein, following agitation, said gel refrigerant substance is solidified by subjecting the same to a low temperature environment below its fusion temperature.

18. A method as in claim 16 wherein, following agitation, said gel refrigerant is solidified by the low temperature environment achieved by said endothermic reduction in temperature of said gel refrigerant substance.

* * * * *